(12) United States Patent
Richard et al.

(10) Patent No.: US 7,676,404 B2
(45) Date of Patent: Mar. 9, 2010

(54) METHOD FOR FORECASTING CONSUMPTION AND GENERATING OPTIMAL DELIVERY SCHEDULES FOR VEHICLES INVOLVED IN DELIVERING PROPANE AND OTHER CONSUMABLES TO END CONSUMERS

(75) Inventors: Dominique M. Richard, Inverness, CA (US); Joel Adler, Conshohocken, PA (US)

(73) Assignee: RMR Associates LLC, Conshohocken, PA (US)

( * ) Notice: Subject to any disclaimer, the term of this patent is extended or adjusted under 35 U.S.C. 154(b) by 314 days.

(21) Appl. No.: 10/686,143

(22) Filed: Oct. 14, 2003

(65) Prior Publication Data

US 2005/0049942 A1    Mar. 3, 2005

Related U.S. Application Data

(60) Provisional application No. 60/418,780, filed on Oct. 15, 2002.

(51) Int. Cl.
*G06Q 10/00* (2006.01)

(52) U.S. Cl. .............................. 705/28; 705/1; 705/26

(58) Field of Classification Search .................. 705/26, 705/27, 1, 28; 707/1
See application file for complete search history.

(56) References Cited

U.S. PATENT DOCUMENTS

| | | | |
|---|---|---|---|
| 5,983,198 A * | 11/1999 | Mowery et al. ............... 705/22 |
| 6,567,788 B1 * | 5/2003 | Johnson, Jr. .................. 705/28 |
| 6,937,992 B1 * | 8/2005 | Benda et al. .................... 705/7 |
| 7,177,825 B1 * | 2/2007 | Borders et al. ................ 705/26 |
| 7,353,193 B2 * | 4/2008 | Fukushima et al. ........... 705/28 |
| 2002/0019759 A1 * | 2/2002 | Arunapuram et al. .......... 705/7 |
| 2002/0147654 A1 * | 10/2002 | Kraisser et al. ............... 705/26 |
| 2002/0157009 A1 * | 10/2002 | Yamamoto et al. .......... 713/189 |
| 2003/0135304 A1 * | 7/2003 | Sroub et al. .................... 701/1 |
| 2005/0288986 A1 * | 12/2005 | Barts et al. ...................... 705/9 |
| 2006/0015416 A1 * | 1/2006 | Hoffman et al. .............. 705/28 |

OTHER PUBLICATIONS

Walter J. Bell et al., Improving the Distribution of Industrial Gases with an On-line Computerized Routing and Scheduling Optimizer, Dec. 8, 1983, pp. 4-23.*

* cited by examiner

*Primary Examiner*—Jason Dunham
(74) *Attorney, Agent, or Firm*—Woodcock Washburn LLP

(57) ABSTRACT

This invention concerns an improved forecasting and routing system for scheduling propane and other consumable deliveries as well as service deliveries to end consumers by one or more trucks in a multi-stop environment. The invention utilizes information regarding weather history and the consumption history of individual consumers to calculate their future expected demand, and the variability on that demand when sufficient delivery history is available. Customers lacking sufficient delivery history use the consumption of similar customers as a surrogate. This information serves to determine the near optimal set of successive days within which to replenish or service each customer. Knowing this demand the system assembles deliveries into daily truck delivery routes that maximize the consumables delivered per hour. The system is designed for use in cooperation with a computer having memory and incorporates item, customer, weather, and routing information databases.

32 Claims, 21 Drawing Sheets

*Figure 1: Overall system flow*
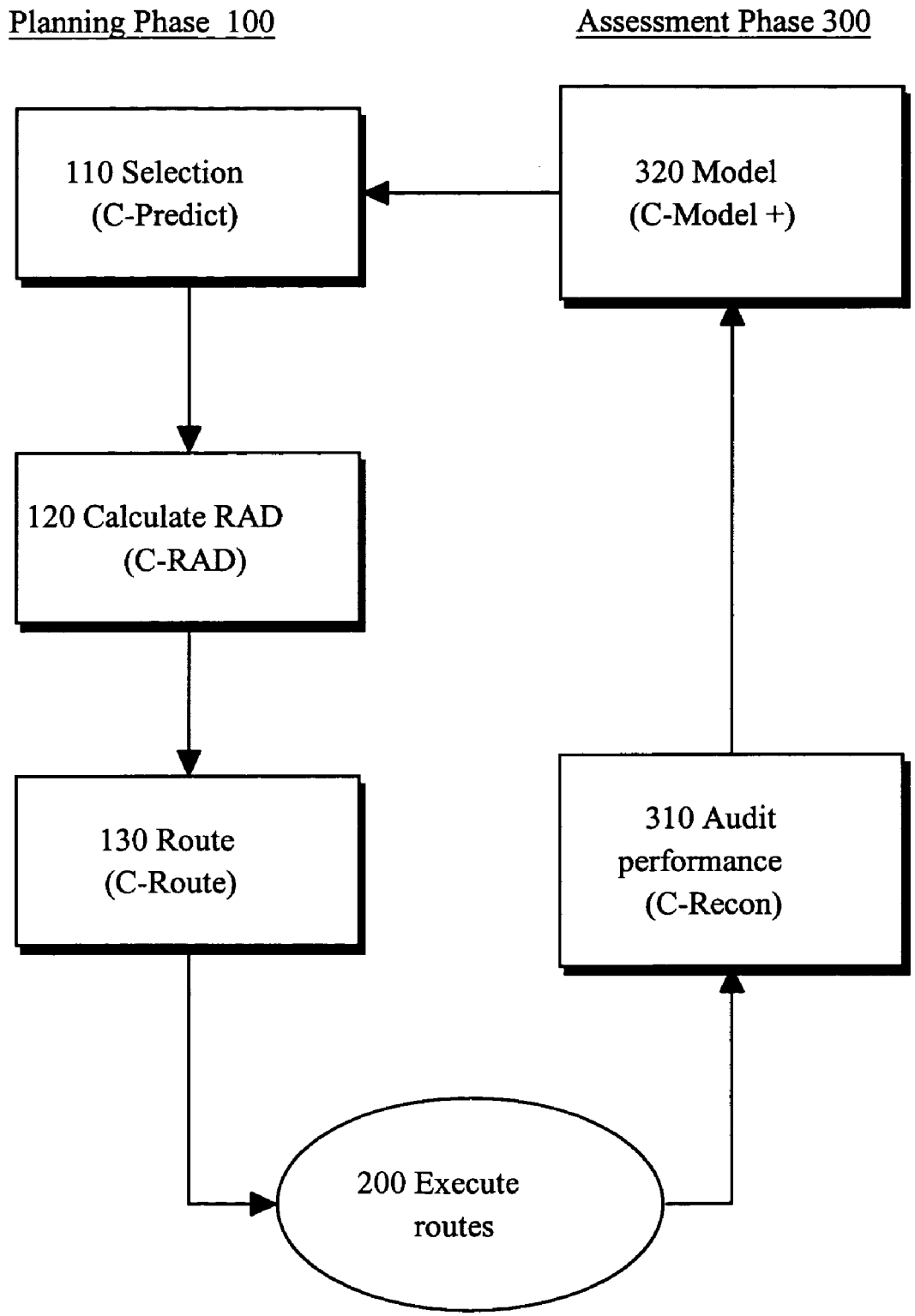

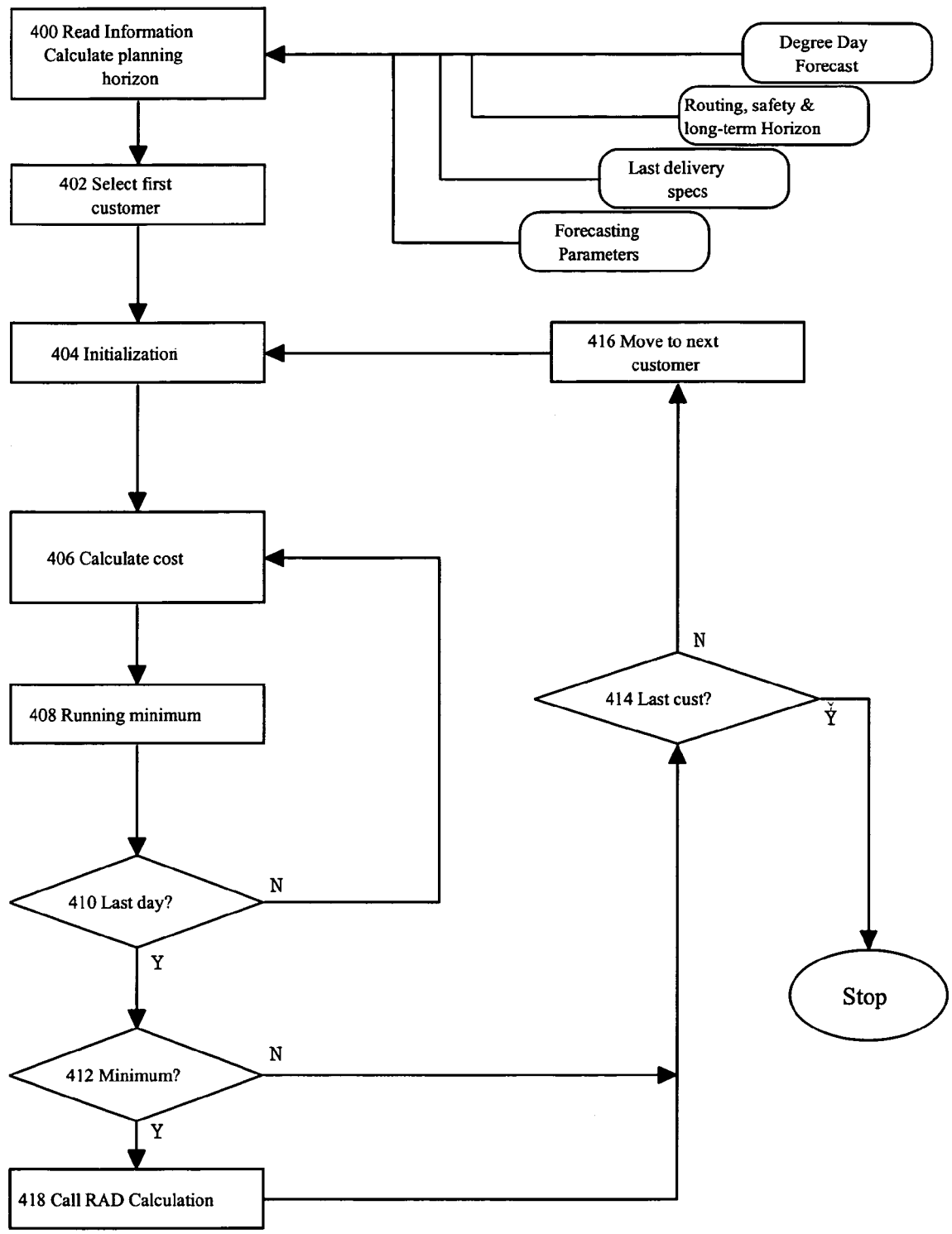
Figure 2a: Step 110 Selection Procedure

Figure 2b: Corresponding pseudo code (When Applicable comments point to the steps in the flowchart)

```
Sub CPredict()

Dim PlanningHorizon, RouteHorizon, SafetyHorizon,LTHorizon As Integer
Dim Cost() As Double
Dim MinCost As Double
Dim LastCustomer As Integer
Dim Minday, calcday As date
Dim Count As Integer Dim Db As Database
Dim Customers As Recordset Set Db = CurrentDb '400 Read information RouteHorizon = 7
SafetyHorizon=2
LTHorizon=7

ReDim Cost(PlanningHorizon)

Set Customers = Db.OpenRecordset("modelreg")
PlanningHorizon = RouteHorizon+SafetyHorizon+LTHorizon '402  Select first customer
Customers.MoveFirst
Customers.MoveLast
LastCustomer = Customers.RecordCount
Customers.MoveFirst For Customer = 1 To LastCustomer
  '404 Initialization
  MinCost = 99999999
  calcday = Now '406 Calculate cost For Day = 1 To PlanningHorizon
   Cost(Day) = DelivCost * (delivery(Day) + riskOG(Day, calcday))
   If Cost(Day) < MinCost Then
     MinCost = Cost(Day)
   End
  Next Day '412 Cost minimum?

If MinCost <= Cost(1) And MinCost < Cost(PlanningHorizon) Then

'418 Calculate RAD

Call CRAD(LHHorizon, SafetyHorizon, RouteHorizon, mincost, RADR)
  End if
Next customer End Sub
```

```
Function delivery(FutureDay)
   delivery = CustomerYearlyDemand * (1 / (0.8 * Customer.TankSize) - 1 / (Dem(FutureDay)))
End Function
Function riskOG(today, FutureDay)
   'Rho is the use sepecified ratio of cost og OG to cost of delivery
   riskOG = normdist(FutureDay) - normdist(today) / (1 - normdist(today)) * Customer.Rho
End Function Function Dem(FutureDay)
   Dem = mu * (FutureDay - lastdelivery) + hf * (DD(FutureDay) - DD(lastdelivery))
End Function
```

Figure 2C

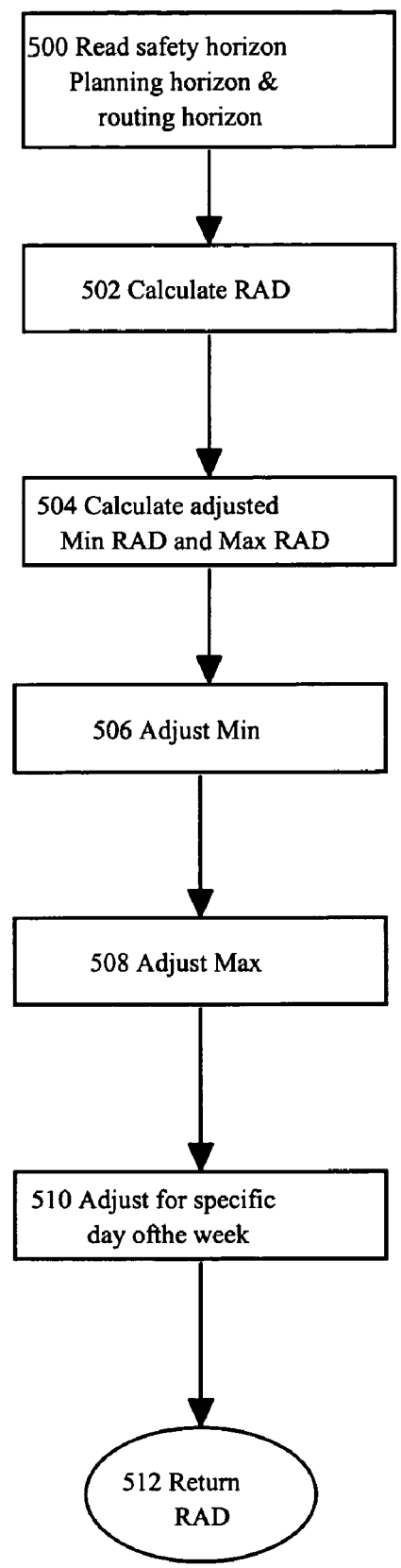
Figure 3a: Step 120 Risk Estimation

Figure 3b: Corresponding pseudo code (When Applicable comments point to the steps in the flowchart)

```
Sub CRAD (LHHorizon, SafetyHorizon, RouteHorizon, mincost, RADR)

Dim Threshold As Double
Dim CostTolerance As Double
Dim LastCustomer, LastSeq, Customer, Pos, Day, Span, RadSeq As Integer
Dim RADN(), RADR(RouteHorizon) As integer
Dim PlanningHorizon as Integer
Dim Day, Dayshift as Integer
Dim Sched1, Sched2 as Integer Dim Db As Database Set Db = CurrentDb '500 Read Safety horizon PlanningHorizon = RouteHorizon+SafetyHorizon+LTHorizon
Redim RADN(PlanningHorizon)

Threshold = 0.9

CostTolerance = MinCost/Threshold

'502 Calculate RAD

For Day = 1 To PlanningHorizon
    RADN(Day)=0
    Cost = DelivCost * (delivery(Day) + riskOG(Day, calcday))
    If Cost < tolerance Then
      If (WeekDay(Now + Day) <> 1 And WeekDay(Now + Day) <> 6) _
        Or Now + Day < RouteHorizon _
      Then
         RADN(Day) = 1
      End If
    End If
    If day > RoutingHorizon+safetyHorizon then
       Priority=2
    Else
       Priority=1
    End If
  Next Day '504 Calculate adjusted Min RAD & Max RAD For day=1 to planninghorizon
   If RADN(day)=1 then
     Dayshift=day-safetyhorizon
     If dayshift > routehorizon then
       Day=planninghorizon
     Else
      If dayshift <=0 then
        RADR(1)=1
      Else
        RADR(dayshift)=RADN(day)
      End if
```

```
    End if
Next day
Sched1=0
For day=1 to routehorizon
   Sched1=Sched1+RADR(day)
Next day
If Sched1=0 then delete
Sched2=0
```

'510 Adjust for specific day of the week

```
  For day=1 to routehorizon
    If RADR(day)=1 & Customer.FIX(Day)=1 then
    RADR(Day)=1
   Else
    RADR(Day)=0
   End if
    Sched2=Sched2+RADR(Day)
  Next Day
  For day=1 to routehorizon
    If Customer.FIX(Day)=1 & Sched1<> 0 & Sched2=0 then
    RADR(Day)=1
  Next Day
End Sub
```

Figure 3c

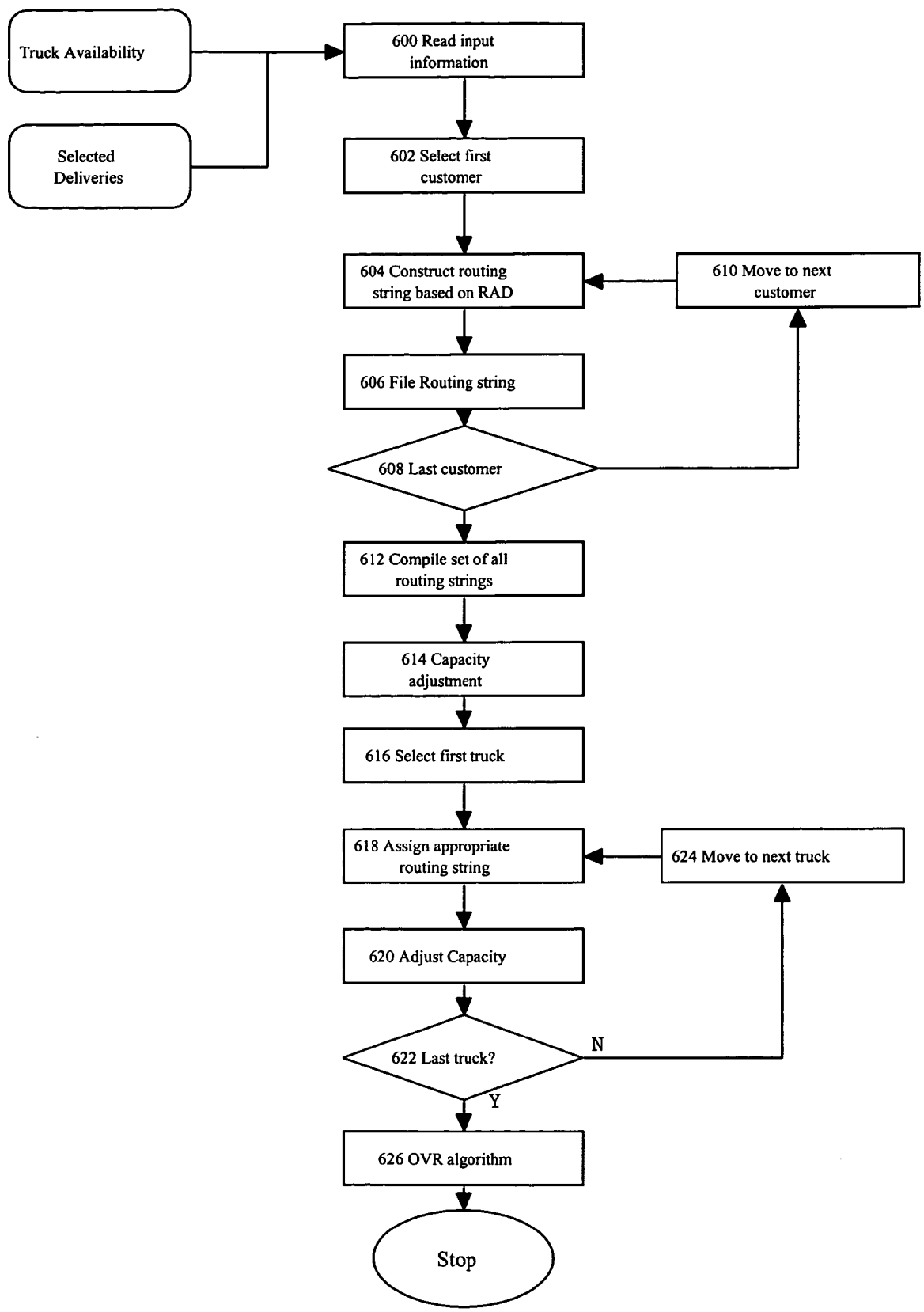
Figure 4a: Step 130 Routing

Figure 4b: Corresponding pseudo code (When Applicable comments point to the steps in the flowchart)

```
Sub CRMRoute()

Dim LastCustomer, LastSeq, Customer, Pos, Day, Span, RadSeq As Integer
Dim RAD As String
Dim FirstDay, LastDay As Integer
Dim Demand, AvrDemand, Demand1, Demand2, CapacityRatio() As Double
Dim Cust, Count As Integer Dim Db As Database
Dim Customers, RadList As Recordset Set Db = CurrentDb '600 read information Set Customer=Db.openrecordset(Modelreg)

'602 Select first customer

Move Customer.first
Move Customer.last
CustomerCount=Customer.Recordcount
Move Customer.first For Cust=1 to CustomerCount
  RAD = ""

'604 Construct routing string based on RAD

For Day = 1 To RouteHorizon
    If RADR(Day)=1 then
      RAD = RAD & Day
    End If
  Next Day '606 File routing string If RAD <> "" Then
    .Edit
    Customer!RAD = RAD
    .Update
  End If
  Move Customer.next
Next Customer ' Customer demand assignement FirstDay = Val(Left(RAD, 1))
LastDay = Val(Right(RAD, 1))
Demand = Dem(FirstDay - 1)
Count = 0
For Day = FirstDay To LastDay
  If Mid(RAD, Day, 1) <> "" Then
    Demand = Demand + consumption
    Count = Count + 1
```

```
  End If
Next Day
AvDemand = Demand / Count
```

'614 Capacity adjustment

```
For Day = 1 To RouteHorizon
  Demand1 = 0
  Demand2 = 0
  Customers.MoveFirst
  For Cust = 1 To LastCustomer
    Span = length(RAD)
    For Pos = 1 To length
      If Val(Mid(Pos, 1) = Day) Then
        Demand1 = Demand1 + Dem(Day)
        Demand2 = Demand2 + AvDemand
      End If
    Next Pos
  Next Customer
  CapacityRatio(Day) = Demand2 / Demand1
Next Day
```

'618 Assign appropriate routing string

```
Db.TableDefs.Delete "RADList"
DoCmd.OpenQuery ("SetUpRADList")
Set RadList = Db.OpenRecordset("RADList")
RadList.MoveFirst
RadList.MoveLast
RadSeq = RadList.RecordCount
For Seq = 1 To RadSeq
  Span = length(RadList!RAD)
  For Pos = 1 To RadSeq
    Day = Mid(RadList!RAD, Pos, 1)
    truck(Day).specialty = RAD
```

'620 Adjust capacity

```
    truck.(Day).capacity=Truck(Day).capacity*Capacity ratio(day)
  Next Pos
Next Seq
```

'626 Routing

Call OVRalgorithm()

End Sub

Figure 4c

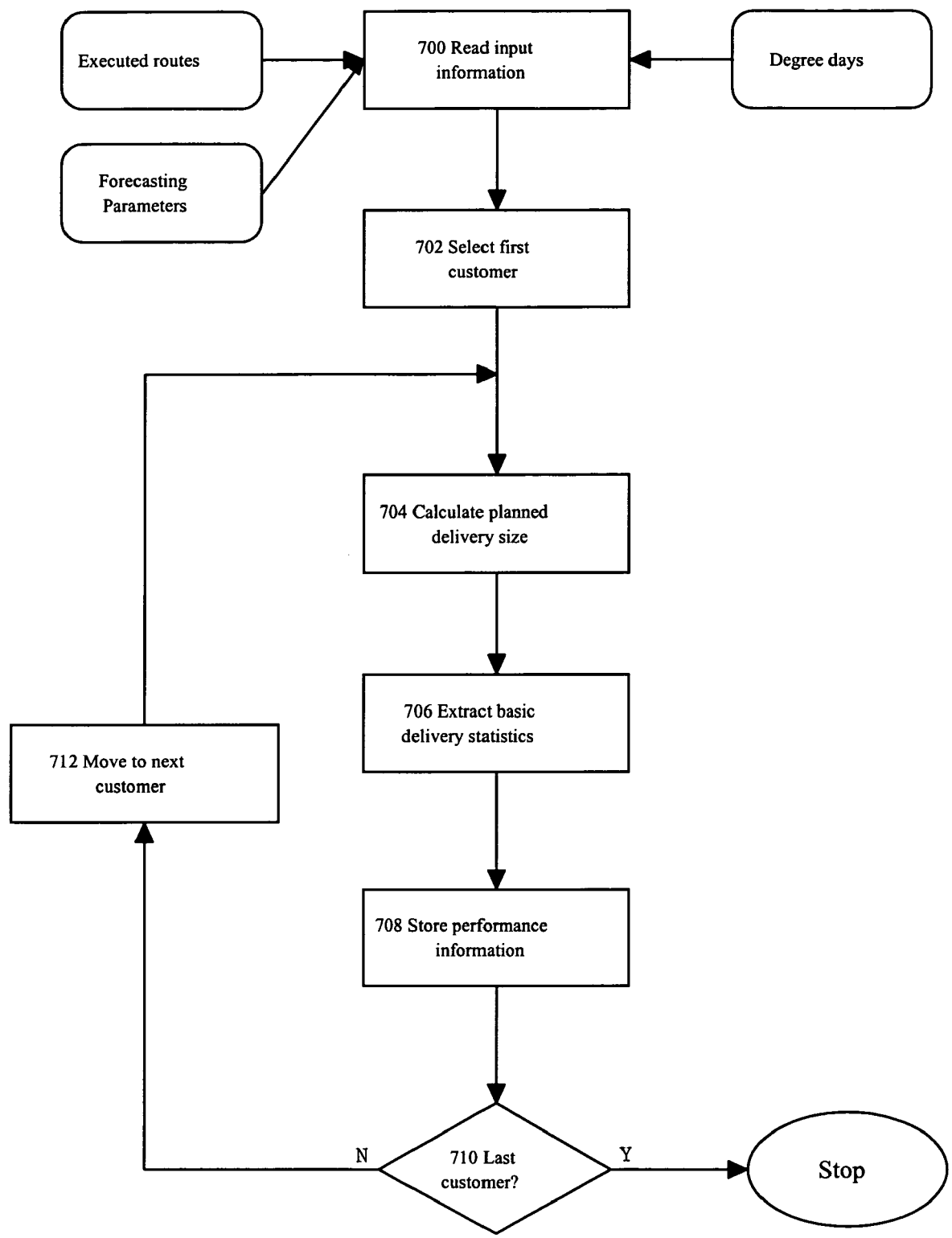
Figure 5a: Step 310 Operational audit procedure

Figure 5b: Corresponding pseudo code (When Applicable comments point to the steps in the flowchart)

Sub crecon()

' 700 Read input information

Start:

'702 Select First customer

Do Until EOF

Read "Degree days"
  Date
  DegreeDay
  CumulativeDegreeDay

Read "Last delivery spec"
  CustomerNumber
  TankSize
  LastDeliveryDate
  LastDeliveryGallons
  LastPercent
  PreviousDeliveryDate
  PreviousPercent Read "Forecasting Parameters"
  CustomerNumber
  DailyUse
  HeatFactor
  Lag
  Residual (Month)
  Seasonal (Month)
  SeasonalProfile (Month)
  DailyStandardDeviation
  CountDeliv ' Initialization GapBound = 15
level = TankSize * LastPercent
Safety = 0
Now = LastDeliveryDate
Gap = InvNorm(1 / (CountDeliv * GapBound))

'704 Calculated planned delivery size

For Day = PreviousDeliveryDate To LastDeliveryDate
level = level - SeasonalProfile(Month(Day)) * _
    (DailyUse + HeatFactor * DegreeDay(Day) + Lag12 * Residual(Month(i)))
Next Day Safety = Gap * DailyStandardDeviation * _
    sqt(Sum(i = PreviousDeliveryDate, LastDeliveryDate)(Seasonal(Month(i))))

'706 Extract Basic delivery statistics

'Adjust actual delivery

LastDeliveryGallons = LastDeliveryGallons * 0.8 / LastPercent

'Calculate days to runout
DaysToRunOut = 0
StatisticalOG = level
Day = LastDeliveryDate
Do Until StatisticalOG < 0
  DaysToRunOut = DaysToRunOut + 1
  StatisticalOG = StatisticalOG - SeasonalProfile(Month(Day)) * _
    (DailyUse + HeatFactor * DegreeDay(Day) + Lag12 * Residual(Month(Day))) - _
    Gap * DailyStandardDeviation * _
    sqt(Sum(i = PreviousDeliveryDate, LastDeliveryDate + DaysToRunOut) _
    (Seasonal(Month(i))))
Loop ' 708 Store performance information write
  CustomerNumber
  DaysToRunOut
  level
  Safety
  LastDeliveryGallons '710 Last Customer?  If no then 712 move to next customer Loop
'if yes then stop End Sub

Figure 5c

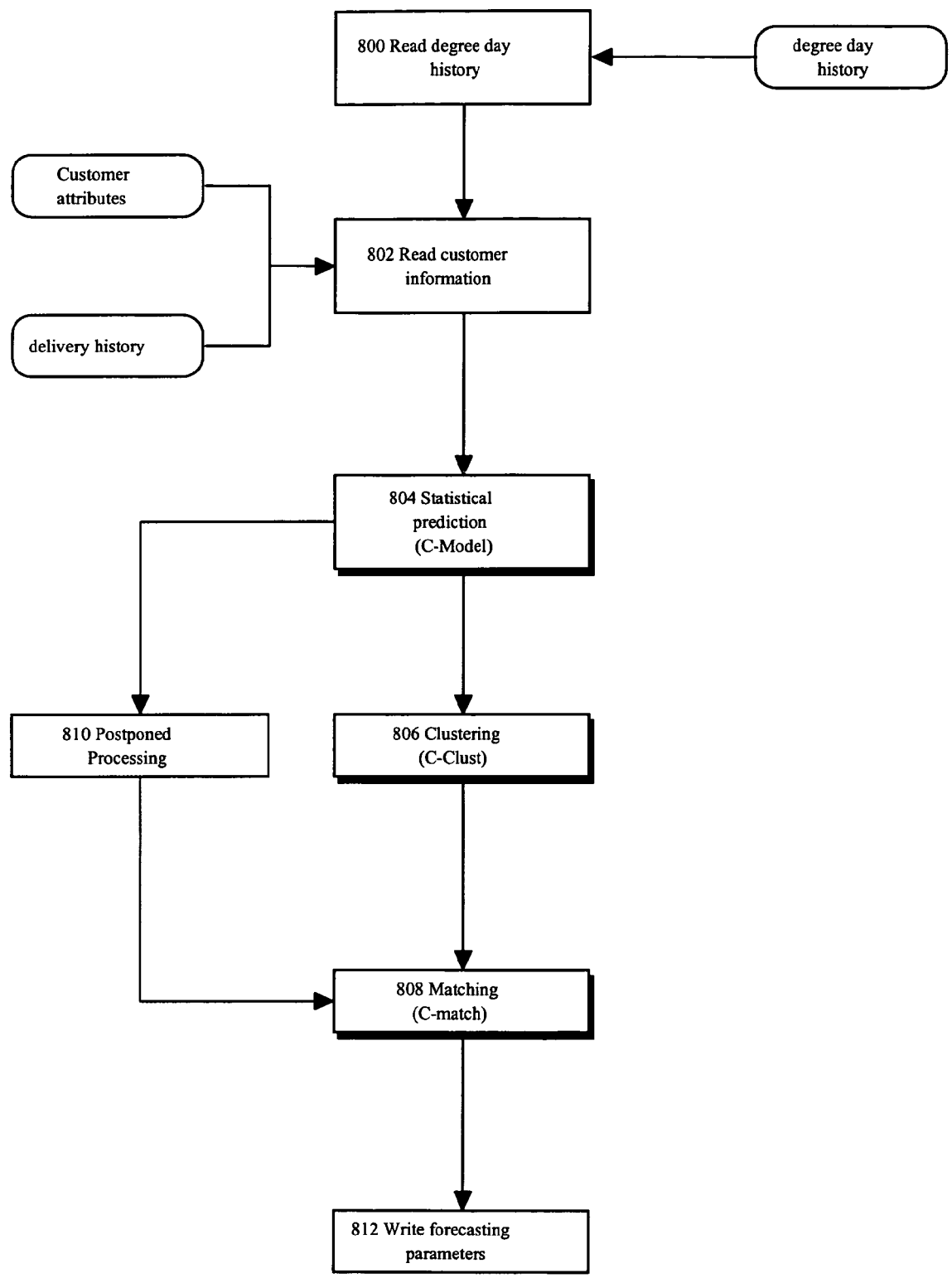
Figure 6: Step 320 Overall flow of the modeling step

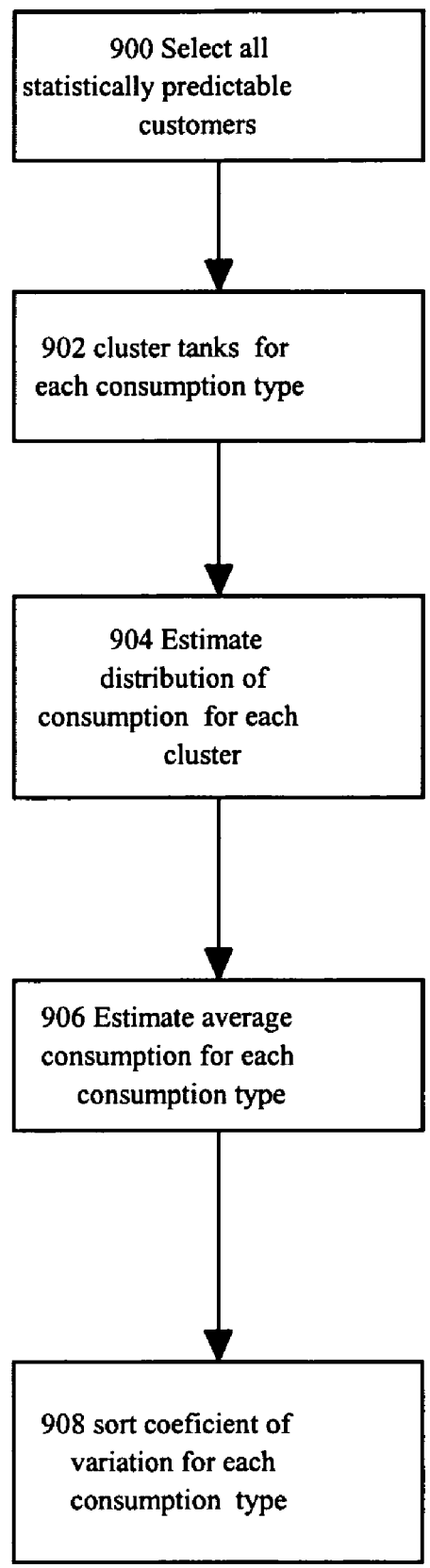
Figure 7a: Step 806 Clustering step

Figure 7b: Corresponding pseudo code (When Applicable comments point to the steps in the flowchart)

Sub clustering()

' 900 Select all statistically predictable customers

Read "CompletedProcessing"
    CustomerNumber
    TankSize
    RoutingMethod
    ConsumptionType
    Seasonal profile
    StartDate
    CountDeliv
    TotalGallons
    MeanGallons
    StdGallons
    MeanInterval
    StdInterval
    DailyUse
    HeatFactor
    Lag12
    Seasonal (Month)
    Residual (Month)
    DailyStandardDeviation
    YearConsumption ' 902 Cluster tanks for each consumption type Define TankThreshold()

AverageConsumption = DailyUse + HeatFactor * YearDD / 365

Sort by ConsumptionType tanksize output SortedTanks

For Each TankSize In ConsumptionType
  If Not First.TankSize Then
    Gap = TankSize - Lag(TankSize)
  End If
Next TankSize sort by ConsumptionType and descending Gap Do Until Gap < TankThreshold
  TankBound = TankSize
  output ClusterBoundaries
Loop '904 estimate distribution of consumption for each cluster Cluster = First(ClusterBoundaries)

For Each TankSize In ConsumptionType
  If TankSize < TankBound Then
    Percentile (Consumption)
  Else
    CDailyUse = SafetyLevel(DailyUse)

```
    CHeatFactor = SafetyLevel(HeatFactor)
    MoveNext ClusterBoundaries
  End If
Loop '906 estimate average consumption for each consumption type for each ConmsumptionType
  MDailyUse = mean(DailyUse)
  MHeatFactor = mean(HeatFactor)
Loop ' 908 Sort coefficient of variation for each consumption type For Each TankSize In ConsumptionType
  CV = StdDev / Consumption
sort by consumptiontype consumption CV End Sub
```

Figure 7c

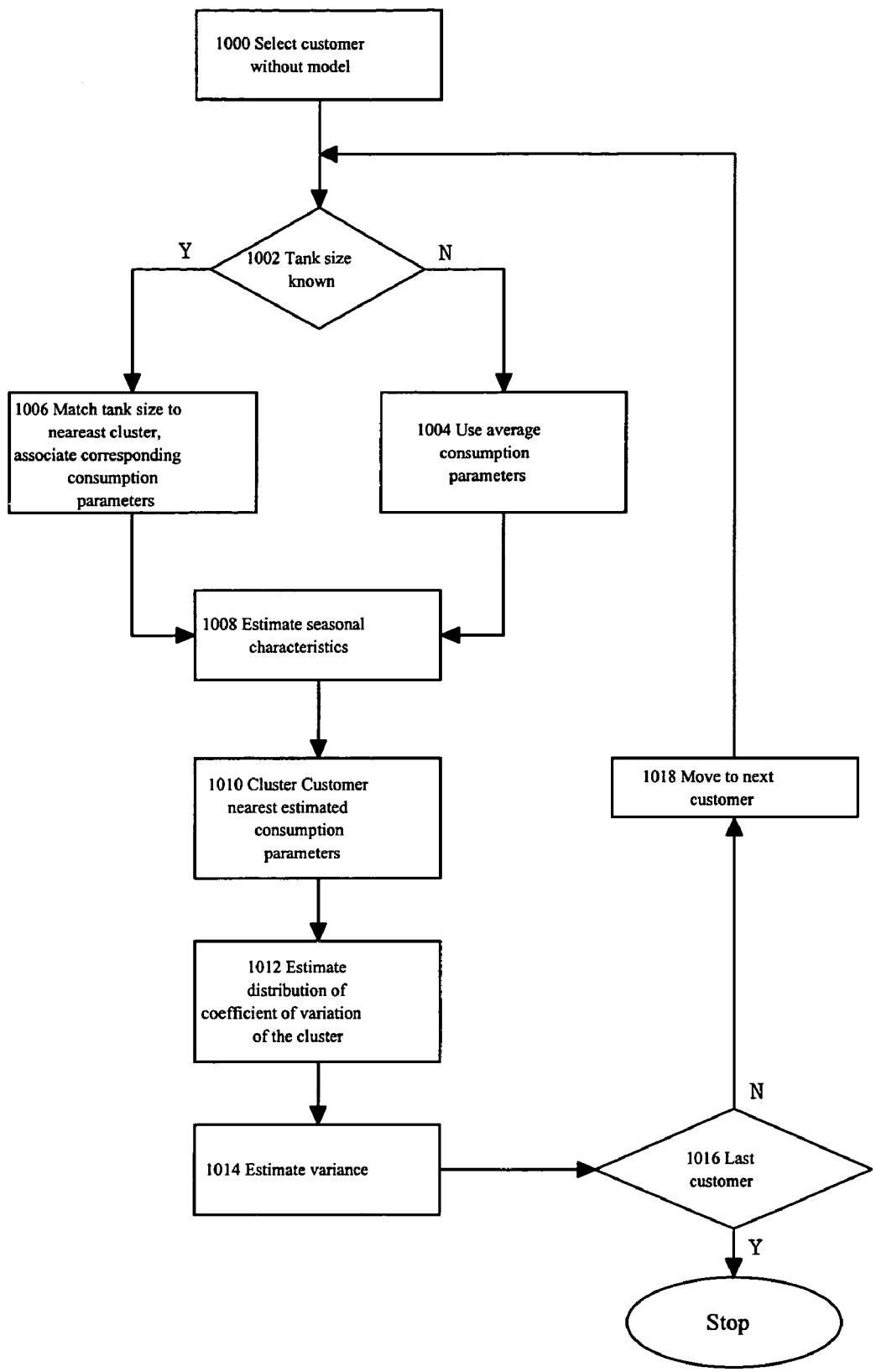
Figure 8a: Step 808 Matching step

Figure 8b: Corresponding pseudo code (When Applicable comments point to the steps in the flowchart)

Sub Matching()

Do Until EOF

' 1000 select customer without model

Read "PostponedProcessing"
  CustomerNumber
  TankSize
  RoutingMethod
  ConsumptionType
  SeasonalProfile (Month)
  StartDate
  CountDeliv
  TotalGallons
  MeanGallons
  StdGallons
  MeanInterval
  StdInterval
  DailyUse
  HeatFactor
  Seasonal (Month)
  Residual (Month)
  YearConsumption 'Clustering criterion for variance Define Varbound()

' 1002 Tank size known

If TankSize = 0 Or TankSize = Null Then

' 1004 Use average consumption parameters

Select Case ConsumptionType
    Case "Heat"
      DailyUse = 0
      HeatFactor MHeatFactor
    Case "Non-Heat"
      DailyUse = MDailyUse
      HeatFactor = 0
    Else
      DailyUse = MDailyUse
      HeatFactor = MHeatFactor
  End Select '1006 Match tank size to nearest cluster, associate corresponding _
consumption parameters Else
  Select Case ConsumptionType
    Case "Heat"
      For Each TankBound In ConsumptionType

```
      If TankSize < TankBound And TankSize >= Lag(TankBound) Then
        DailyUse = 0
        HeatFactor = CHeatFactor
      End If Next TankBound
  Case "Non-Heat"
    For Each TankBound In ConsumptionType
      If TankSize < TankBound And TankSize >= Lag(TankBound) Then
        DailyUse = CDailyUse
        HeatFactor = 0
      End If
    Next TankBound
  Else
    For Each TankBound In ConsumptionType
      If TankSize < TankBound And TankSize >= Lag(TankBound) Then
        DailyUse = CDailyUse
        HeatFactor = CHeatFactor
      End If
    Next TankBound
  End Select
End If ' 1008 estimate seasonal characteristics Lag12 = 1
For Month = 1 To 12
  If Seasonal <> Null Then
    Residual = Seasonal / 30.4 * (DailyUse + HeatFactor * YearDD / 365)
  Else
    Residual = 1 / 30.4 * (DailyUse + HeatFactor * YearDD / 365)
  End If
Next Month 'Variance estimation EstConsumption = DailyUse + HeatFactor * YearDD / 365

Read "VarCluster"

' 1010 Cluster customer nearest estimated consumption parameters

For Each Consumption In VarCluster(ConsumptionType)
  If Consumption <= EstConsumption + Varbound And _
     Consumption > EstConsumption - Varbound Then
    Percentile (CV)
  End If
Next Consumption ' 1012 estimate distribution of coefficient of variation of the cluster estCV = Safety(CV)

' 1014 estimate variance

DailyStandardDeviation = CV * Consumption
```

Figure 8c write "CompletedProcessing"
  RC
  CustomerNumber
  TankSize
  RoutingMethod
  ConsumptionType
  SeasonalProfile (Month)
  StartDate
  CountDeliv
  TotalGallons MeanGallons
  StdGallons
  MeanInterval
  StdInterval
  DailyUse
  HeatFactor
  Lag12
  Seasonal (Month)
  Residual (Month)
  DailyStandardDeviation
  YearConsumption '1018 move to next customer MoveNext '1016 last customer Loop End Sub

Figure 8d

METHOD FOR FORECASTING CONSUMPTION AND GENERATING OPTIMAL DELIVERY SCHEDULES FOR VEHICLES INVOLVED IN DELIVERING PROPANE AND OTHER CONSUMABLES TO END CONSUMERS

CROSS REFERENCE TO RELATED APPLICATIONS

This application claims benefit of U.S. Provisional Application No. 60/418,780 filed Oct. 15, 2002.

FIELD OF THE INVENTION

The invention concerns an improved forecasting and routing system for scheduling propane and other consumable deliveries to end consumers by one or more capacity limited trucks in a multi-stop environment.

BACKGROUND OF THE INVENTION

Techniques are known for optimizing vehicle routing to replenish inventories in the case of the delivery of consumable products or periodic services using trucks in a multi-stop environment. Industry practices in these areas are set forth below.

Inventory Replenishment-Delivery Economics:

In general, consumption parameters provided by time series forecasting modeling modules calculate expected inventory levels for every day since the last delivery. The expected run out date will occur when the cumulative expected consumption has exhausted the last recorded inventory, which is usually captured at the last delivery. If there were no cost penalty to exhausting inventories, one would wait for that event before triggering replenishment. That would minimize the number of deliveries.

However, since substantial penalties are incurred for exhausting inventories (e.g. running out of propane gas), a classic inventory calculation trading off increased lot size/(decreased annual unit shipping costs) and expected stock out costs/(out of gas penalties) is needed to determine the optimal delivery day (ODD) which therefore occurs sometime before the expected run out day. The smaller the variance (error in predicting consumption) the closer the ODD is to the expected run out day and the steeper the trade off curve. The techniques used in this calculation have long been utilized for inventory reordering in a variety of industrial settings. Typically, the ODD will further be advanced by an additional number of days of reserve, which is the lead time within which a delivery is reasonably assured (e.g. allowing time for a second delivery if the first one failed for any reason). To handle special cases of deliveries, the system will also allow customer specified delivery days that override any statistically determined optimal delivery day.

Optimal Vehicle Routing:

Deliveries, however, cannot be considered independently because they must be combined with other deliveries on a route. To achieve this, commercially available optimal vehicle routing (OVR) packages, which have been readily available for many years, can be used. The basic purpose of OVR packages is to minimize the mileage and travel time costs associated with delivering a number of predetermined loads subject to a vehicle's carrying capacity (e.g. volume, weight) and allowable time on the road. OVR package functionality details often vary. However, all commercial OVR systems assume that deliveries must be made according to a schedule predetermined in the input. So a delivery required for a given day will be assigned to routes specified for a given day or a delivery which is free to be scheduled on several days will be free to be assigned to routes on those days. In other words, OVR systems consider only the geographic efficiencies of the routes generated to guide the assignment and cannot deal with additional complications inherent in delivery of consumable commodities, such as:

(1) OVR packages cannot account for the variation in delivery quantity that would occur if the delivery day were to change, i.e. delivering a time consumable commodity such as propane or fuel oil earlier would result in a smaller load and therefore allow more vehicle capacity for other deliveries and vice-versa.

(2) OVR packages cannot account for the day dependent expected cost of an individual delivery that are derived from inventory replenishment cost trade-offs.

There has been some experimentation in the propane industry with the use of OVR packages but because of the two complications identified above, these exercises have assumed very conservative service policies on delivery day selection (to avoid out of gas conditions). Over time these conservative policies result in the generation of significantly more customer deliveries than would be generated if both temporal (delivery day selection) and geographic (delivery sequencing) dimensions were optimized concurrently. Such optimization is implemented in accordance with the invention.

SUMMARY OF THE INVENTION

The invention is an improved scheduling and routing system for deliveries of propane and other consumables and periodic services via trucks with finite capacity that provides the timing, sequence, quantities, choice of replenishing locations and vehicle selection for deliveries. In accordance with a first feature of the invention, software estimates the consumption of customers with limited delivery history by using their individual characteristics (e.g., tank size) to match them with a pool of similar customers whose consumption can be statistically determined from their delivery history. In accordance with a second feature of the invention, software combines the specific over the road routing economics with the delivery economics for delivering propane to maximize the rate of delivery in gallons per hour. These two features in combination with existing industry practices in inventory replenishment and optimal vehicle routing form the components of the invention.

Forecasting Consumable Consumption

The invention is designed for use in cooperation with a computer having memory and is assumed to interface with external administrative information systems that capture necessary input data for analysis. Among the critical items captured are (1) customer information including delivery location, storage tank size for the consumable, consumption type (e.g., for propane, consumption types include: heating, cooking, swimming pools, and combinations of the above) and (2) customer consumable delivery history (dates & quantities). For energy based consumables such as propane or heating oil, also captured is the weather history (temperatures or degree-days) and weather forecasts in terms of degree-days, a commonly used metric in the propane and fuel oil industries. The system uses the above inputs to model consumption of the consumable at the customer level. In this model, both the expected consumption and its variance must be derived to optimally schedule deliveries.

For propane, relatively short time series (0 to 20 deliveries) characterize consumption at the customer level; therefore, exogenous information (e.g., type of usage, tank size, size of residence, periods when no consumption is known to occur) is used to guide the statistical analysis. The exogenous information becomes progressively less important with the length of the time series and consistency of consumption of the consumable. The system recognizes that the reliability of exogenous information is not certain.

For example, statistical analysis of 20 deliveries (observations) may derive better forecasts without the use of exogenous information. However, with less than ten deliveries, one almost always needs exogenous information to reduce the degrees of freedom that must be statistically resolved. In cases of less than 3 to 5 deliveries, forecasting is totally dependent on the use of exogenous characteristics to link a given customer to a cluster of other customers for whom consumption parameters have been reliably calculated. These clusters would typically include customers attached to the geographically local business unit but may also be derived from customers external to that unit, particularly if the local unit is just initiating operations.

At the conclusion of the forecasting phase each customer has one to three consumption parameters (expected time dependency, degree day dependency, seasonal dependency) necessary to forecast its mean consumption and a variance term. The invention thus provides a seamlessly integrated multiple-technique forecasting approach to short time series analysis.

Risk Managed Routing for Consumable (Integration of Routing & Forecasting):

The principal outputs of the cost trade off calculation derived from the forecasting and inventory replenishment optimization is the ODD, and a table of expected delivery quantities by day, as well as the expected cost penalties that would be incurred by advancing or postponing deliveries from the ODD. The invention extends the cost optimization for individual deliveries for consumable replenishment with the road routing economics of making several deliveries in sequence. The system accomplishes this by tightly integrating OVR algorithms for optimal route generation with the algorithms for optimal delivery day (ODD) selection, to allow a global optimization with cost trade offs between out of consumable penalties, the costs of multiple trips to deliver the consumable over the long term for an individual customer, and the daily costs of time and miles on the road for executing a route to deliver the consumable to a number of different customers. Therefore, in this invention, the total cost function, which is minimized, includes the routing costs typically considered by OVR algorithms plus the marginal cost penalties of shifting a delivery away from its ODD.

Specifically, the days on which deliveries can be made are variable (with the exception of those which are a priori restricted) thereby greatly increasing the number of possible route assignments for a given delivery. This combinatorial relaxation leads to substantially lower cost than the alternative approach, which first applies ODD calculations to generate a delivery schedule that remains fixed during the subsequent OVR algorithm optimization.

BRIEF DESCRIPTION OF THE DRAWINGS

A method for forecasting consumption and generating optimal delivery schedules for vehicles involved in delivering propane and other consumable deliverables and periodic services to end consumers in accordance with the invention is further described below with reference to the accompanying drawings, in which:

FIG. 1 illustrates the overall system flow of software implementing the invention.

FIGS. 2a-2c illustrate the logic of the selection step with the associated pseudo-code.

FIGS. 3a-3c illustrate the logic of the RAD calculating step with the associated pseudo-code.

FIGS. 4a-4c illustrate the logic of the routing step with the associated pseudo-code.

FIGS. 5a-5c illustrate the logic of the audit performance step with the associated pseudo-code.

FIG. 6 illustrates the overall process of the modeling step in accordance with the invention.

FIGS. 7a-7c illustrate the logic of the clustering step with the associated pseudo-code.

FIGS. 8a-8d illustrate the logic of the consumption-matching step with the associated pseudo-code.

DETAILED DESCRIPTION OF ILLUSTRATIVE EMBODIMENTS

A particular embodiment of the invention is described below in detail and is intended to incorporate all alternatives, modifications and equivalents as to implementation on particular choices of computing hardware, software, or network platforms. The pseudo-code shown below can be implemented with a variety of appropriately functional procedural programming languages including C++, Visual Basic or Java, combined with any of a number of statistical libraries such as SAS, Wolfram Research and NAG. The choice of operating systems and database management systems is open as well. The algorithms can be deployed on single or networked workstations, on distributed or centralized processors. Such variations are intended to be covered by the claims defining the invention.

Of particular interest is the utilization of commercially available OVR packages for user interaction and display purposes. There are number of these packages commercially available. Furthermore, the OVR optimization algorithms can be employed to greatly simplify the optimization coding required by the system as a whole. The nature of this adjustment will also be described below.

A presently preferred implementation of the system of the invention utilizes the Windows operating system operating on a Pentium 4 or greater chip. It utilizes C++, Visual Basic for Applications (VBA) and the Microsoft ACCESS database manager. It also utilizes SAS for statistical analysis. Finally, it preferably interfaces to the OVR package offered by ESRI called Arc Logistics Route (ESRI™). Those skilled in the art will appreciate that other hardware and software configurations available on the market also may be used.

Introduction

Those skilled in the art will appreciate that the "consumable" delivery described herein may include propane fuel deliveries, fuel oil deliveries, automatic teller machine (ATM) replenishment, field equipment preventive maintenance and other industrial deliveries of products that require periodic replenishment or services that require periodic scheduling. The propane delivery application is described in detail in an exemplary embodiment below as it is one of the more complex applications. The approach enumerated for propane deliveries may be simplified for other embodiments of the invention for other consumable delivery or periodic service delivery applications.

The implementation of the invention includes two phases, one phase with three steps, and the other phase with two, which are run cyclically on a daily basis. As shown in FIG. 1, the first phase is a planning phase 100. It occurs prior to the dispatching of a fleet for deliveries (execute routes step 200), typically in the early morning. It includes a selection step 110, a risk evaluation step 120, and a routing step 130. The second phase is an assessment phase 300. It occurs after the return of the fleet from their delivery runs, typically in the evening. It includes an operational audit step 310 and a forecasting step 320.

FIG. 1 shows the daily workflow among these steps and the following pages describe the processes involved in each step with reference to the more detailed diagrams shown in FIG. 2 through FIG. 8. Additional reference is made to pseudo-code, which provides the inputs, outputs and logic for each step.

Planning Phase

1. Selection:

The logic of the selection step 110 is shown in FIG. 2a with the associated pseudo-code in FIGS. 2b and 2c.

In this step, three contiguous and successive time horizons are defined:

First, a routing horizon over which customers are routed;

Second, a safety (lead time) horizon which specifies an arbitrary safety level that deliveries must respect (i.e., if customers are delivered with 14 days of safety the average inventory at delivery time will be 10.5 days before run out); and Third, a long-term horizon needed to take advantage of available truck capacity.

At step 400, the degree-day forecast, last delivery specification, and forecasting parameters are read. The routing, safety and long-term horizon are also read in that step and used to calculate the overall planning horizon. The overall planning horizon is defined as the sum of all three horizons. Given this planning horizon, the customer selection process begins at step 402 by evaluating a cost trade-off function specific for each customer using the forecasting parameters calculated in the modeling step. The cost trade-off function reflects the trade-off between the cost of delivery and the cost associated with the risk of out-of-gas (OG) on any given day. Since this function over time is convex it exhibits a single minimum that is used as the criterion for selecting the day for a customer delivery.

Specifically, the availability of this cost function allows calculation, after initialization at step 404, of the total expected cost of delivery to each customer on every day of the planning horizon (step 406). This total expected cost is the sum of the delivery cost (which decreases with time because the delivery quantity will increase with time) and the expected stock-out cost (which increases with time as the inventory gets closer to exhaustion). A running minimum is determined at step 408 until the last day is reached (step 410). The day on which this total expected cost is minimal is the ODD (optimal delivery day) (step 412). This process is repeated for each customer (steps 414 and 416) until the cost has been calculated for all customers. As a rule, every customer for whom the cost trade-off function reaches its minimum (ODD) within the planning horizon is selected for routing. In addition, all customers whose ODD fall within the long-term horizon should be assigned a lower priority than the one assigned to the customers whose ODD fall within the routing and the safety horizon.

The specifics of the selection depend on the level of geographical and operational constraints imposed to the routing, and on the service policy.

a. The constrains are defined by the combination of geographical and temporal limitation imposed on the routing. Four scenarios are possible:
  (1) A geographical area may be assigned to a particular vehicle active on a particular day of the week.
  (2) A geographical area may be assigned to any vehicle active on a particular day of the week.
  (3) A geographical area may be assigned to a particular vehicle active on any day of the week.
  (4) A geographical area may be assigned to any vehicle active on any day of the week.

b. The service policy dictates that a customer should be afforded two chances at being delivered to avoid contingencies due to bad weather, and vehicle or operator availability. This service policy dictates the length of the safety horizon. Therefore, in scenario 1 and 2, which operates on a weekly cycle, this policy constrains the selection of customers to be triggered within a 14-day safety horizon. For scenario 3 or 4, since customers can be visited any day of the week, this policy constrains the selection of customers to be triggered within a 2-day safety horizon.

Note that the selection of customers can follow other logic such as the imposition of a forced cycle or the reaching of the constant storage level (e.g., 20%). However, the proposed method, which accounts for both a consumption rate dependent on time and degree-days and the variability of that rate, provides the most accurate methodology for the selection process.

2. Risk evaluation: Calculate RAD

Once the cost minimum is determined in the selection procedure of FIG. 2a, the range-of-allowable-days (RAD) calculation is performed (step 418). The logic of this step is shown on FIG. 3a with the associated pseudo-code in FIGS. 3b and 3c.

As shown in FIG. 3a, the safety horizon, planning horizon and routing horizon are read at step 500. To place an upper bound on the risk that customers might incur in the timing of their deliveries, a customer specific RAD for delivery is defined and calculated at step 502. The RAD is used by the routing algorithm to restrict the delivery to these days.

The procedure calculates the RAD for the set of customers identified in the selection process discussed above with respect to FIG. 2a. Initially, the RAD is defined as the set of contiguous days within which the cost trade-off function values fall within a given tolerance of the optimal (minimum) value. This range of values is called the cost-tolerance-span. Because the cost trade-off function depends on many factors (i.e. Cost of delivery, cost of OG, yearly demand, storage size, consumption rate and consumption variance) these ranges-of-allowable-days will be different for every customer.

Then two adjustments are required to this initial RAD:

a. The RAD must be shifted in time by the amount of safety horizon and modified as follows:

If the RAD's minimum falls earlier than the first day of the routing horizon the RAD's minimum is replaced by the first day of the routing horizon;

If the RAD's maximum falls earlier than the first day of the routing horizon the RAD's maximum is replaced by the first day of the routing horizon;

If the RAD's minimum falls within the routing horizon and the RAD's maximum falls later than the last day of the routing horizon the RAD's maximum is replaced by the last day of the routing horizon;

If the RAD's minimum falls later than the last day of the routing horizon, the delivery is not considered (postponed).

As shown in FIG. 3a, the adjusted minimum RAD and adjusted maximum RAD are calculated at step 504 and adjusted at steps 506 and 508. In general, only those customers with a non-empty RAD are retained for routing (i.e. those for which the adjusted RAD's minimum lies inside the routing horizon).

b. The RADs of customers that must be delivered on specific days of the week must be further restricted to only those days at step 510. This occurs systematically in cases 1 and 2 defined above or, more generally, when customers are "forced" to a specific delivery day(s). For instance, in most environments, every customer delivery will be restricted to weekdays (i.e. Monday through Friday). If the required day of the week is not available in the calculated RAD it override's the calculated RAD.

The RAD value is returned at step 512. Note that other assignments methods could be used for the definition of RAD. The one proposed above, however, provides the best delivery efficiency with the most controlled risk.

3. Route

The logic of the routing step is shown on FIG. 4a with the associated pseudo-code in FIGS. 4b and 4c.

To complete the routing procedure, the following input needs to be provided:

1. A capacity adjustment—which estimates the capacity changes necessary to reflect day-to-day variation in the demand.
2. A truck assignment—which assigns all defined RADs to trucks The truck availability and selected delivery information is read at step 600 and the first customer is selected at step 602. To communicate the RAD constraints to the routing algorithm, the procedure assigns a string of pre-determined symbols (e.g. "123" or "457" or "25") to each customer (the "routing string") at step 604. These strings indicate the days of the routing horizon on which a customer can be delivered. For instance the string "123" would means that a customer can only be delivered on the first, second or third day of the routing schedule. Similarly, under that scheme, the string "457" would mean that a customer could only be delivered on the fourth, fifth or seventh day of the routing schedule. Finally the string "25" would mean that a customer could only be delivered on the second and the fifth day of the schedule. These routing strings are filed at step 606. The process is repeated for all customers through steps 608 and 610.

Once the "routing strings" are assigned to the orders and compiled at step 612, the average demand over the final RAD is assigned to each of the selected customers. This demand assignment however poses a problem since the expected demand on any day prior to the day for which the average actually occurs will be systematically smaller than the average. Conversely, the expected demand on any day after the day the average occurs will be systematically larger than the average. These systematic errors will translate in systematic under-capacity early in the routing schedule and systematic over-capacity at the end of the routing schedule. To mitigate this effect the daily capacity of the trucks needs to be adjusted at step 614. This adjustment is calculated for each day of the routing horizon as follows:

a. For a given day, the total potential demand for that day is calculated using the average demand assignment.
b. For the same day, the total potential demand for that day is estimated using the expected demand derived from the forecasting parameters.
c. The gallon capacity of the trucks assigned to service the schedule on that day is then adjusted by multiplying the truck capacities by the ratio these two demands (Total average/Total expected) for that day.

This process is performed for each truck starting at step 616. To complete preparation for routing, the routing strings defining the RADs at the customer level must be associated with the trucks assigned to the schedule at step 618. This assignment is done in such a way that each of the trucks defined as available for a given day is assigned all the string symbols that contains that day of operation in the schedule. For instance, in the example above, all trucks slated to operate on the second day of the schedule will be assigned the string "123" and "25" defined above but not the string "457". Similarly, all truck slated to operate on the fifth day of the schedule will be assigned the string "457" and "25" defined above but not the string "123". Alternatively, the string "123" will be assigned to all the trucks slated to operate on the first, second and third day of the schedule. Similarly the string "457" will be assigned to all the trucks slated to operate on the fourth, fifth and seventh day of the schedule and the string "25" will be assigned to all the trucks slated to operate on the second and fifth day of the schedule.

At the end of this string matching process each truck will be associated with a set of routing strings and only those customer deliveries matching a string in that set may be assigned to that truck. This process is repeated for all trucks at steps 620, 622, and 624.

The routing algorithm follows the logic of the chosen OVR at step 626, which accounts for the constraints specified in the customer demand and their RADs. The string matching technique that partially reflects those constraints would typically require additional programming logic to what is provided in an off-the-shelf OVR package. This invention will first be implemented using the ESRI Arc Logistics Route Package wherein the "specialties" feature facilitates the string matching process.

Once the optimization is completed counter adjustments to the truck capacity need to be reversed for reporting purposes.

Assessment Phase

4. Audit performance

The logic of the audit performance step is shown on FIG. 5a with the associated pseudo-code in FIGS. 5b and 5c.

This operational audit compares actual and predicted gallons delivered on the day when the actual delivery occurred. This provides information about the performance of the forecasting model. It also identifies the customers whose recent delivery history is not consistent with the forecasting model. In most cases these exceptions reflect actual changes in customer behavior that can be recorded and appropriately dealt with.

This step can also measure the risk position of customers at the time of delivery. This information may point to systematic delays in executing delivery schedules that may point to a lack of delivery capacity or user mishandling of the information provided by the routing system. Such information may be the basis for justification of capacity expansion or training.

In particular, as shown in FIG. 5a, the degree-days, executed routes, and forecasting parameters are read at step 700. Then, starting at step 702, for each customer the planned delivery size is calculated (step 704), and basic delivery statistics are extracted (step 706), and the performance information is stored (step 708). This process is repeated at steps 710 and 712 for each customer.

This operational audit information as well as the descriptive statistics generated during the modeling step can be used to support many other management functions not identified in this document because they fall outside the specific scope of this invention.

5. Model

This step adds the delivery data (e.g., gallons delivered and tank level for propane) on the day of its occurrence to the customer's delivery history. This information is used to adjust the consumption parameters of that customer. This step is typically completed every evening on the set of customers delivered during the day.

As shown in FIG. 6, this process reads in the degree-day history (step 800) and customer delivery history and customer attributes (step 802). The system then performs three processes:

- a statistical estimation of consumption parameters for those customers who have a stable and extensive history (step 804),
- a clustering of the population of those statistically estimated customers into groups distinguished by specific attributes (step 806), and
- a consumption matching of customers, whose consumption characteristics cannot be statistically estimated, to clusters of statistically estimated customers with similar attributes (steps 808 and 810).

The resulting forecasting parameters are written at step 812.

The overall process of modeling is shown on FIG. 6 and the logic of relevant modeling steps and the associated pseudo-code are shown on FIGS. 7 and 8. Only steps 804-808 require textual elaboration and follow in that sequence below.

Statistical estimation (step 804)

The statistical estimation is conducted with standard time series techniques that may include Winter's model, Box-Jenkins techniques or multiple regression methods. The purpose of this estimation is to identify and calculate statistically significant parameters that can be used to evaluate future consumption and its variance. In the propane industry, for example, these techniques are appropriate for about 50% of the customer population.

Clustering (Step 806)

The logic of the clustering step is shown in FIG. 7a with the associated pseudo-code in FIGS. 7b and 7c. The objective of the clustering methodology is to stratify the population of customers with statistically estimated consumption parameters. This stratification defines a number of sub populations characterized by specific attributes (e.g. tank size, appliances), which are associated with an appropriate set of consumption parameters that represent the entire population.

Step 1: Customers whose consumption parameters have been statistically estimated (step 900) are grouped by consumption type (e.g., heat, non-heat and mixed) and clustered using a chain-map procedure (step 902). Specifically, each group is sorted in ascending order of tank size and the difference between a customer tank size and that of its predecessor in the sorted ranking order is calculated. This difference represents a metric for similarity in customer tank sizes. Boundaries between clusters of tank size are then established when this difference exceeds a pre-set threshold.

Step 2: With this cluster definition, the distribution of consumption parameters of all the customer of each cluster is estimated (step 904), and a typical level of consumption for the cluster is defined as a high percentile (e.g. 65%) of that consumption rate distribution. The estimate is biased to be higher than the expected consumption in order to take a conservative position in regards to stock-outs. To determine the $65^{th}$ percentile the parameters for a cluster are first calculated. Individual cells are then defined by equally dividing these ranges. Starting from the lowest cell, which includes the lowest value of the parameters, the percentile is incremented by adding neighboring cells that are included when a parameter range is incremented by one step. For heat and time dependency, this increment only affects one parameter. For the mixed case, the increments alternate between heat and time parameters. When the accumulated percentile reaches 65% the parameter values, which correspond to that level, are associated with the cluster under analysis.

Step 3: Finally a "catch-all" cluster is defined for each consumption type. The consumption parameters specific to the clusters of a given consumption type are then defined as high a percentile (e.g. 65%) of the consumption parameters for the entire population of customers of that consumption type. At step 906, the average consumption for each consumption type is estimated.

Step 4: In addition to clusters of consumption type and tank size, this process provides a list of customers sorted by consumption level and coefficient of variation for each consumption type. These lists are used to estimate variance in the consumption matching process (steps 1010-1014). The coefficient of variation for each consumption type is sorted at step 908.

Consumption Matching (step 808):

The logic of the consumption-matching step is shown on FIG. 8a with the associated pseudo-code in FIGS. 8b-8d.

The results from the clustering process are used in the consumption matching procedure that is designed to assign consumption parameters and variance to customers whose delivery data does not permit reliable statistical estimation. This is predicated on the notion that customers with similar consumption types and similar tank sizes tend to consume gas at comparable rates.

Specifically, the following matching procedure is applied to each customer for whom the statistical estimation was not possible (heretofore referred to as "customer under analysis"):

Step 1a: The consumption type and tank size of the customers under analysis (step 1000) are used to select the appropriate cluster to represent it. It is then assigned the set of consumption parameters that characterize this cluster.

Step 1b: If the tank size of the customer under analysis is determined at step 1002 to be missing or out of range it is assigned the characteristics of the "catch-all" cluster of their consumption type (step 1004); otherwise, the tank size is matched to the nearest cluster at step 1006. At this point, if appropriate, the seasonality characteristic of the cluster is also associated with the customer under analysis (step 1008).

Step 2: The variance of the customer under analysis is then estimated using steps 1010-1014:

The consumption parameters of the customer under analysis which were assigned in steps 1a or 1b above are used to build a temporary cluster of approximately 40 customers who have statistically reliable parameters. These customers must have the same consumption type as the customer under analysis and their consumption rate must fall within a predefined interval around the consumption rate of the customer under analysis. (Step 1010)

The distribution of the coefficient of variation of consumption in this temporary cluster is then evaluated (step 1012) and the estimation of a high percentile of this distribution provides an estimate for the calculation of the variance of the consumption of the customer under analysis (step 1014). Again in this step the high percentile reflects a conservative assumption regarding stockout conditions.

At the end of these modeling steps, every customer should have

1. A means to forecast expected consumption in the future (i.e., forecasting parameters)
2. An estimate of its daily variance.

These terms, along with descriptive statistics are the only requirements to run the selection process (FIG. 2*a* above).

Additional Embodiments for Applications Other than Propane Delivery

Fuel Oil: Fuel oil is used exclusively for heating. This simplifies the statistical regression analysis required for forecasting consumption because non-heating usage parameters can be dropped from the regression.

ATM cash replenishment: ATM replenishment forecasting generally has lengthy time series available for forecasting. Therefore, clustering techniques for short time series are generally not needed although they may still be useful for setting up schedules for new installations. Also, the physical dimensions of cash canisters are fixed so that the truck capacity needed to make a delivery will not vary with the timing of the delivery. However, since ATM replenishment often occurs concurrently with ATM maintenance the scheduling algorithms may be driven by two demand factors instead of one.

Field Equipment Preventive Maintenance and Servicing: The consumable is time and not a delivered commodity. Therefore, physical truck capacities are not a factor in limiting routes although time on the route will still be constrained. Furthermore, the equipment failure probabilities over time may be specified by the equipment manufacturers and not be derived statistically from failure history, so as in the ATM case the scheduling algorithms will be driven by two demand factors instead of one.

Those skilled in the art will also appreciate that numerous other modifications to the invention and numerous other applications for "consumable" products are possible within the scope of the invention. Accordingly, the scope of the invention is not intended to be limited to the exemplary embodiments described above, but only by the appended claims.

What is claimed:

1. A scheduling and routing system implemented on a processor, said system including an application program that is implemented on said processor for use in calculating delivery routes for delivering a consumable to customers via commercial delivery vehicles, comprising:

a delivery forecasting system implemented on said processor that consumption matches certain customers to other customers with similar attributes and that forecasts from the delivery profiles of the other customers with similar attributes and/or historical profiles of deliveries to said certain customers, when each said certain customer is anticipated to run out of inventory of the consumable;

an integrated inventory replenishment, scheduling and routing system implemented on said processor that generates a delivery route for a commercial delivery vehicle that prioritizes customers for delivery of said consumable based on risk of inventory depletion before delivery of more inventory of the consumable, said delivery route being generated based on (a) said forecasts and (b) variable parameters including road routing economics of making several deliveries in sequence to a plurality of said customers before replenishment of the commercial delivery vehicle; and a cost trade-off function implemented on said processor that reflects the trade-off between the cost of delivery of the consumable and the cost associated with the risk of running out of the consumable on any given day, whereby a minimum of said cost trade-off function is used by said integrated inventory replenishment, scheduling and routing system as a criterion for selecting a day for customer delivery, said processor further calculating within a routing horizon for each customer a range of allowable days for delivery of the consumable, said range of allowable days being defined as a set of contiguous days within which the cost trade-off function values fall within a given tolerance of an optimal value.

2. The scheduling and routing system of claim 1, wherein the integrated inventory replenishment, scheduling and routing system includes an algorithm for optimal route generation and an algorithm for optimal delivery day selection, said optimal route generation and optimal delivery day selection algorithms being integrated so as to allow a global optimization with cost trade offs among penalties for running out of the consumable, the costs of multiple trips to deliver the consumable over the long term for an individual customer, and the daily costs of time and miles on the road for executing a route to deliver the consumable to a number of different customers.

3. The scheduling and routing system of claim 1, wherein the delivery forecasting system further provides variable statistical parameters for replenishment of inventory of the consumable, the variable statistical parameters including an expected consumption parameter and an estimate of the variability of the expected consumption parameter.

4. The scheduling and routing system of claim 1, wherein the variable parameters include a routing horizon over which customers are routed, availability of the commercial delivery vehicle, and a range of allowable days for delivery.

5. The scheduling and routing system of claim 1, wherein the consumable is propane.

6. The scheduling and routing system of claim 1, wherein said delivery forecasting system calculates a planning horizon as a function of a routing horizon over which customers are routed, a lead time horizon that specifies an arbitrary safety level that deliveries must respect before the consumable is depleted, and a long-term horizon.

7. The scheduling and routing system of claim 6, wherein said processor is further programmed to calculate a total expected cost of delivery to each customer on every day of the planning horizon as a sum of the cost of delivery of the consumable and an expected out of stock cost for the consumable, whereby a day on which the total expected cost of delivery is a minimum is identified as an optimal delivery day.

8. The scheduling and routing system of claim 7, wherein said integrated inventory replenishment, scheduling and routing system generates a delivery route for each customer for whom the optimal delivery day for that customer is within the planning horizon.

9. The scheduling and routing system of claim 8, wherein said integrated inventory replenishment, scheduling and routing system assigns a routing string to each customer indicating the days of the routing horizon on which the consumable may be delivered to the customer.

10. The scheduling and routing system of claim 8, wherein said integrated inventory replenishment, scheduling and routing system associates routing strings defining the range of allowable days for a customer to a delivery vehicle to be assigned a calculated delivery route.

11. A computer-implemented method of forecasting consumption and generating optimal delivery schedules for delivery of consumables to customers by commercial delivery vehicles, comprising the steps of:

a computer processing instructions for consumption matching a customer to other customers with similar attributes and forecasting the customer's consumption of the consumable from the delivery profiles of the other customers with similar attributes and/or historical delivery profiles for deliveries to said customer and, from the customer's forecasted consumption, forecasting when said customer is anticipated to run out of inventory of the consumable;

the computer processing instructions for generating a delivery route for a commercial delivery vehicle that prioritizes customers for delivery of said consumable based on risk of inventory depletion before delivery of more inventory of the consumable, said delivery route being generated based on (a) forecasts in said forecasting step and (b) variable parameters for minimizing cost for inventory replenishment of the consumable for individual deliveries by the commercial delivery vehicle, said variable parameters including road routing economics of making several deliveries in sequence to a plurality of said customers before replenishment of the commercial delivery vehicle; and the computer processing instructions for implementing a cost trade-off function that reflects the trade-off between the cost of delivery of the consumable and the cost associated with the risk of running out of the consumable on any given day, whereby a minimum of said cost trade-off function is used as a criterion for selecting a day for customer delivery, said computer further calculating within a routing horizon for each customer a range of allowable days for delivery of the consumable, said range of allowable days being defined as a set of contiguous days within which the cost trade-off function values fall within a given tolerance of an optimal value.

12. The method of claim 11, wherein the delivery route generating step comprises the step of integrating an algorithm for optimal route generation and an algorithm for optimal delivery day selection so as to allow a global optimization with cost trade offs among penalties for running out of the consumable, the costs of multiple trips to deliver the consumable over the long term for an individual customer, and the daily costs of time and miles on the road for executing a route to deliver the consumable to a number of different customers.

13. The method of claim 11, wherein the days on which deliveries can be made are variable so as to increase the number of possible delivery route assignments for a given delivery of a consumable to a customer.

14. The method of claim 11, wherein the forecasting step includes the step of creating at least one consumption parameter unique to the customer and a variance term.

15. The method of claim 11, comprising the further step of assigning priorities to customers to dictate the order in which commercial vehicle capacity is exhausted.

16. The method of claim 11, wherein the delivery forecasting system further provides variable statistical parameters for replenishment of inventory of the consumable, the variable statistical parameters including an expected consumption parameter and an estimate of the variability of the expected consumption parameter.

17. The method of claim 11, wherein the variable parameters include a routing horizon over which customers are routed, availability of the commercial delivery vehicle, and a range of allowable days for delivery.

18. The method of claim 11, wherein the consumable is propane.

19. A program storage device readable by a processor and storing thereon a program of instructions executable by said processor for forecasting consumption and generating optimal delivery schedules for delivery of consumables to customers by commercial delivery vehicles, said program of instruction causing said processor to:

consumption match a customer to other customers with similar attributes and to forecast the customer's consumption of the consumable from the delivery profiles of the other customers with similar attributes and/or historical delivery profiles for deliveries to said customer and, from the customer's forecasted consumption, forecasting when said customer is anticipated to run out of inventory of the consumable, generate a delivery route for a commercial delivery vehicle that prioritizes customers for delivery of said consumable based on risk of inventory depletion before delivery of more inventory of the consumable based on (a) forecasts in said forecasting step and (b) variable parameters for minimizing cost for inventory replenishment of the consumable for individual deliveries by the commercial delivery vehicle, said variable parameters including road routing economics of making several deliveries in sequence to a plurality of said customers before replenishment of the commercial delivery vehicle;

implement a cost trade-off function that reflects the trade-off between the cost of delivery of the consumable and the cost associated with the risk of running out of the consumable on any given day, whereby a minimum of said cost trade-off function is used as a criterion for selecting a day for customer delivery; and calculate within a routing horizon for each customer a range of allowable days for delivery of the consumable, said range of allowable days being defined as a set of contiguous days within which the cost trade-off function values fall within a given tolerance of an optimal value.

20. The program storage device of claim 19, wherein the program of instructions further causes the processor to integrate an algorithm for optimal route generation and an algorithm for optimal delivery day selection so as to allow a global optimization with cost trade offs among penalties for running out of the consumable, the costs of multiple trips to deliver the consumable over the long term for an individual customer, and the daily costs of time and miles on the road for executing a route to deliver the consumable to a number of different customers.

21. The program storage device of claim 19, wherein the days on which deliveries can be made are variable so as to increase the number of possible delivery route assignments for a given delivery of a consumable to a customer.

22. The program storage device of claim 19, wherein the program of instructions further creates at least one consumption parameter unique to the customer and a variance term.

23. The program storage device of claim 19, wherein the program of instructions further assigns priorities to customers to dictate the order in which commercial vehicle capacity is exhausted.

24. The program storage device of claim 19, wherein the delivery forecasting system further provides variable statistical parameters for replenishment of inventory of the consumable, the variable statistical parameters including an expected consumption parameter and an estimate of the variability of the expected consumption parameter.

25. The program storage device of claim 19, wherein the variable parameters include a routing horizon over which customers are routed, availability of the commercial delivery vehicle, and a range of allowable days for delivery.

26. The program storage device of claim 19, wherein the consumable is propane.

27. A scheduling and routing system implemented on a processor, said system including an application program that is implemented on said processor for use in calculating delivery routes for providing periodically scheduled services to customers via commercial delivery vehicles, comprising:
a delivery forecasting system implemented on said processor that consumption matches certain customers to other customers with similar attributes and that forecasts from the delivery profiles of the other customers with similar attributes and/or historical profiles of deliveries of the periodically scheduled services to said certain customers when each said certain customer is anticipated to need the periodically scheduled services;
an integrated scheduling and routing system implemented on said processor that generates a delivery route for a commercial delivery vehicle that prioritizes customers for delivery of said services based on risk of needing the services before delivery of the periodically scheduled services, said delivery route being generated based on (a) said forecasts and (b) variable parameters including road routing economics of making several deliveries in sequence to a plurality of said customers before rerouting of the commercial delivery vehicle; and
a cost trade-off function implemented on said processor that reflects the trade-off between the cost of delivery of the consumable and the cost associated with the risk of running out of the consumable on any given day, whereby a minimum of said cost trade-off function is used by said integrated inventory replenishment, scheduling and routing system as a criterion for selecting a day for customer delivery, said processor further calculating within a routing horizon for each customer a range of allowable days for delivery of the consumable, said range of allowable days being defined as a set of contiguous days within which the cost trade-off function values fall within a given tolerance of an optimal value.

28. The scheduling and routing system of claim 27, wherein the integrated scheduling and routing system includes an algorithm for optimal route generation and an algorithm for optimal delivery day selection, said optimal route generation and optimal delivery day selection algorithms being integrated so as to allow a global optimization with cost trade offs among penalties for the customer requiring the service, the costs of multiple trips to deliver the service over the long term for an individual customer, and the daily costs of time and miles on the road for executing a route to deliver the service to a number of different customers.

29. A computer-implemented method of providing periodically scheduled services to customers by commercial delivery vehicles, comprising the steps of:
a computer processing instructions for consumption matching a customer to other customers with similar attributes and forecasting the customer's need for the services from the delivery profiles of the other customers with similar attributes and/or historical delivery profiles for deliveries of the periodically scheduled services to said customer and, from the customer's forecasted need, forecasting when said customer is anticipated to need the periodically scheduled services; and
the computer processing instructions for generating a delivery route for a commercial delivery vehicle that prioritizes customers for delivery of said services based on risk of needing the services before delivery of the periodically scheduled services, said delivery route being generated based on (a) said forecasts and (b) variable parameters including road routing economics of making several deliveries in sequence to a plurality of said customers before rerouting of the commercial delivery vehicle; and
the computer processing instructions for implementing a cost trade-off function that reflects the trade-off between the cost of delivery of the consumable and the cost associated with the risk of running out of the consumable on any given day, whereby a minimum of said cost trade-off function is used as a criterion for selecting a day for customer delivery, said computer further calculating within a routing horizon for each customer a range of allowable days for delivery of the consumable, said range of allowable days being defined as a set of contiguous days within which the cost trade-off function values fall within a given tolerance of an optimal value.

30. The method of claim 29, wherein the delivery route generating step comprises the step of integrating an algorithm for optimal route generation and an algorithm for optimal delivery day selection so as to allow a global optimization with cost trade offs among penalties for the customer requiring the service, the costs of multiple trips to deliver the service over the long term for an individual customer, and the daily costs of time and miles on the road for executing a route to deliver the service to a number of different customers.

31. A program storage device readable by a processor and storing thereon a program of instructions executable by said processor for forecasting need for periodically scheduled services and generating optimal delivery schedules for delivery of the services to customers by commercial delivery vehicles, said program of instruction causing said processor to:
consumption match a customer to other customers with similar attributes and to forecast the customer's need for the services from the delivery profiles of the other customers with similar attributes and/or historical delivery profiles for deliveries of the periodically scheduled services to said customer and, from the customer's forecasted need, forecasting when said customer is anticipated to need provision of the periodically scheduled services,
generate a delivery route for a commercial delivery vehicle that prioritizes customers for delivery of said services based on risk of needing the services before delivery of the periodically scheduled services, said delivery route being generated based on (a) said forecasts and (b) variable parameters for minimizing cost for individual deliveries by the commercial delivery vehicle, said variable parameters including road routing economics of making several deliveries in sequence to a plurality of said customers before rerouting of the commercial delivery vehicle;
implement a cost trade-off function that reflects the trade-off between the cost of delivery of the consumable and the cost associated with the risk of running out of the consumable on any given day, whereby a minimum of said cost trade-off function is used as a criterion for selecting a day for customer delivery; and
calculate within a routing horizon for each customer a range of allowable days for delivery of the consumable, said range of allowable days being defined as a set of contiguous days within which the cost trade-off function values fall within a given tolerance of an optimal value.

32. The program storage device of claim 31, wherein the program of instructions further causes the processor to integrate an algorithm for optimal route generation and an algorithm for optimal delivery day selection so as to allow a global optimization with cost trade offs among penalties for the customer requiring the service, the costs of multiple trips to deliver the service over the long term for an individual customer, and the daily costs of time and miles on the road for executing a route to deliver the service to a number of different customers.

* * * * *